US007818406B2

(12) United States Patent
Jania et al.

(10) Patent No.: US 7,818,406 B2
(45) Date of Patent: Oct. 19, 2010

(54) ENABLING REMOTE LOCALE SPECIFIC OPERATIONS IN MULTIPLE LOCALE AND USER ENVIRONMENTS

(75) Inventors: Frank L. Jania, Chapel Hill, NC (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/948,096

(22) Filed: Nov. 30, 2007

(65) Prior Publication Data

US 2009/0144432 A1    Jun. 4, 2009

(51) Int. Cl.
*G06F 15/177* (2006.01)
(52) U.S. Cl. ............................ 709/221; 709/228; 713/1; 713/100
(58) Field of Classification Search ......... 709/220–223, 709/227–228; 713/1–2, 100
See application file for complete search history.

(56) References Cited

U.S. PATENT DOCUMENTS

| 6,314,516 | B1 | 11/2001 | Cagle et al. | |
|---|---|---|---|---|
| 2002/0032735 | A1 | 3/2002 | Burnstein et al. | |
| 2002/0120692 | A1* | 8/2002 | Schiavone et al. | 709/206 |
| 2006/0185003 | A1 | 8/2006 | Laitinen et al. | |
| 2008/0270413 | A1* | 10/2008 | Gavrilov et al. | 707/10 |
| 2008/0317292 | A1* | 12/2008 | Baker et al. | 382/115 |
| 2009/0170536 | A1* | 7/2009 | Rang et al. | 455/466 |

OTHER PUBLICATIONS

Murphy et al., "Lime: A Coordination Model and Middleware Supporting Mobility of Hosts and Agents", ACM Transactions on Software Engineering and Methodology, vol. 15, No. 3, pp. 279-328 (Jul. 2006).
Li et al., "Transparent Sharing and Interoperation of Heterogeneous Single-User Applications", CSCW'02, New Orleans, Louisiana (Nov. 16-20, 2002).
Kaplan et al., "Designing Support for Remote Intensive-Care Telehealth using the Locales Framework", DIS'97, Amsterdam, The Netherlands (1997).
Cheung et al., "Infinity: A Generic Platform for Application Development and Information Sharing on Mobile Devices", MobiDE'07, Beijing, China (Jun. 10, 2007).

* cited by examiner

*Primary Examiner*—Salad Abdullahi
(74) *Attorney, Agent, or Firm*—Cuenot, Forsythe & Kim, LLC (57) ABSTRACT

A computer-implemented method of negotiating locale settings among a plurality of users communicating over a communication network can include determining a locale for each of a plurality of remotely located users, identifying at least one locale setting for each of the plurality of users according to the locale of each respective user, wherein the locale setting for each of the plurality of users forms at least one locale setting group, and determining whether each locale setting group is exclusive or non-exclusive. For each locale setting group that is exclusive, a locale setting from the locale setting group can be selected and, for each locale setting group that is non-exclusive, a locale setting union can be generated by taking a union of all locale settings of the locale setting group. The selected locale setting and/or the local setting union can be applied to a message exchanged between the users.

20 Claims, 2 Drawing Sheets

ENABLING REMOTE LOCALE SPECIFIC OPERATIONS IN MULTIPLE LOCALE AND USER ENVIRONMENTS

FIELD OF THE INVENTION

The embodiments of the present invention relate to computers and, more particularly, to computer communications.

BACKGROUND OF THE INVENTION

Electronic mail (e-mail) and instant messaging are two pervasive forms of computer-based communication. E-mail generally refers to non-real time, two-way electronic communications over a network, such as the Internet, between two or more users. Typically, when composing a new e-mail message, a user selects one or more recipients, types a subject and a message, and sends the e-mail message to the one or more recipients. A recipient of an e-mail message may choose to reply by selecting a reply option, typing a message, and sending the reply e-mail message.

Instant messaging enables real time, two-way electronic communication over a network between two or more users. Instant messaging may also be referred to as chat. Typically, users of instant messaging clients log on to a messaging server. A user of an instant messaging client may choose to contact one or more other users of messaging clients by selecting the one or more other users from a contact list. Usually, the contact list will indicate availability of the other users. The user may then type and send an initial instant message to the selected users. Upon receiving the initial instant message, a recipient can type and send a reply instant message.

BRIEF SUMMARY OF THE INVENTION

The embodiments disclosed herein relate to communications conducted over a communication network. One embodiment of the present invention can include a computer-implemented method of negotiating locale settings among a plurality of users communicating over a communication network. The method can include determining a locale for each of a plurality of remotely located users, identifying at least one locale setting for each of the plurality of users according to the locale of each respective user, wherein the locale setting for each of the plurality of users forms at least one locale setting group, and determining whether each locale setting group is exclusive or non-exclusive. The method can include, for each locale setting group that is exclusive, selecting a locale setting from the locale setting group and, for each locale setting group that is non-exclusive, generating a locale setting union by taking a union of all locale settings of the locale setting group. At least one of the selected locale setting or the local setting union can be applied to a message exchanged among the plurality of users.

Another embodiment of the present invention can include a computer-implemented method of negotiating locale settings among a plurality of users communicating over a communication network including identifying a plurality of remotely located users comprising at least three users. The method can include determining a locale for each of the plurality of users, identifying a locale setting for each of the plurality of users according to the locale for each user, wherein the locale setting for each of the plurality of users constitutes a locale setting group, and determining at least one selected locale setting according to a reconciliation technique applied to the locale setting group. The method can include applying the selected locale setting to messages exchanged among the plurality of users.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk—read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein provide a framework for negotiating locale specific settings of computer systems that may be used when communicating with one or more remote users. Users located in different geographic regions, e.g., locales, may utilize different computer settings such as dictionaries for purposes of spell checking, grammatical rules, textual formatting rules, and the like. These different conventions often are locale specific and may be programmed into application programs and/or operating systems. When engaged in a communication session with two or more users that are within different locales, e.g., are remotely located from one another, such conventions, e.g., locale settings, can be negotiated prior to establishment of the communication session or the sending of a message as part of that session. Determining which locale settings will be utilized prior to involvement in a communication session can reduce confusion and miscommunication among the participants.

As used herein, the phrase "communication session" can refer to the sending or exchange of electronic messages. For example, an exchange of instant messages during an instant messaging session between a sender and recipient(s) may be considered a communication session. In another example, an exchange or sending of an electronic mail (e-mail) message may also be considered a communication session between the sender and recipient(s) despite the non-real time nature of e-mail.

Figure 1:
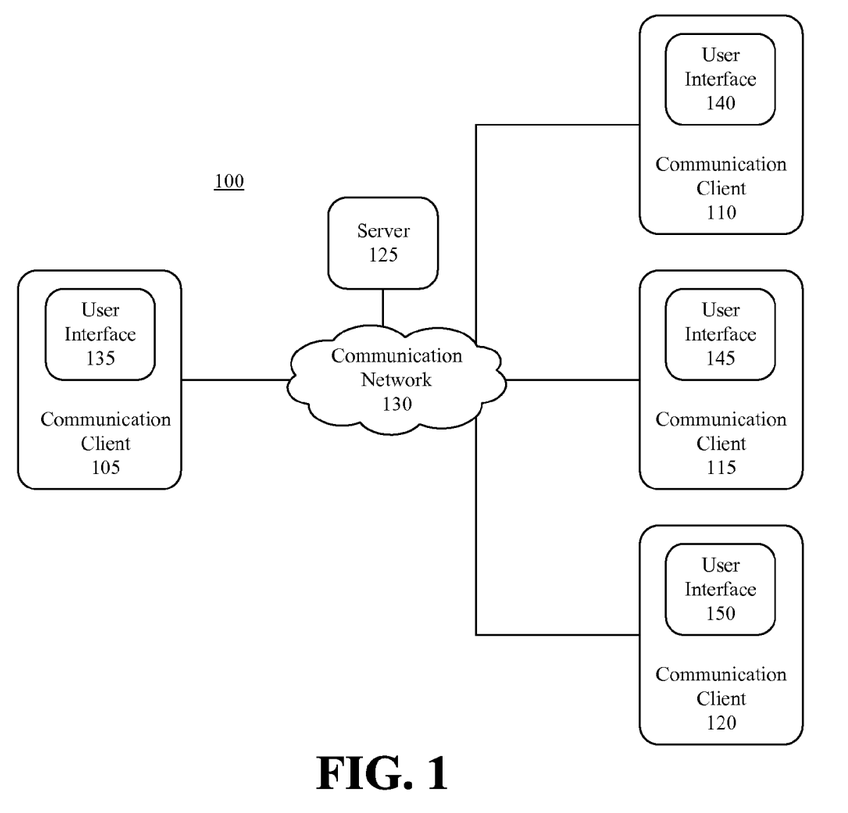
FIG. 1 is a block diagram illustrating a communication system that negotiates locale settings in accordance with one embodiment of the present invention.

FIG. 1 is a block diagram illustrating a communication system 100 that negotiates locale settings in accordance with one embodiment of the present invention. The communication system 100 can include communication clients 105, 110, 115, and 120 as well as a server 125. The communication clients 105-120 and the server 125 can be communicatively linked via a communication network 130. The communication network 130 can be implemented as, or include, without limitation, a WAN, a LAN, the public switched telephone network, the Web, the Internet, and/or one or more intranets. The communication network 130 can also include one or more wireless networks, whether short or long range.

The communication clients 105-120 can be, for example, computers, mobile communication devices, such as mobile telephones or personal data assistants (PDAs), network appliances, gaming consoles, or any other data processing system which can communicate with other communication clients, e.g., communication clients 105-120. Each of the communication clients 105-120 can include a respective user interface 135-150, which may be part of a communication application executing therein. The communication application can cause the communication clients 105-120 to communicate via e-mail, instant messaging, which may also be referred to as chat, or the like.

Each of the communication clients 105-120 may also be remotely located from one another. For example, communication client 105 may be located in one geographic area, while communication clients 110-120 may be located in different geographic areas or locales. For instance, communication client 105 may be located within the United States, while communication client 110 is located in Australia, and communication clients 115 and 120 are located in the United Kingdom.

In one embodiment, a user of communication client 105 can access the communication application executing therein via user interface 135 to select a recipient for a message to be exchanged as part of a communication session. For example, the communication application may be an e-mail application and the user may select the recipient by entering an e-mail address in an addressee line of the user interface. According to another example, the communication application may be an instant messaging application and the user may select the recipient by choosing the recipient from a contact list. According to yet another example, the user may have received a message, possibly an e-mail message or possibly an instant message, from the user of communication client 110. According to this example, the user may select the recipient by choosing to reply to the e-mail message or the instant message.

Upon the user selecting the recipient, communication client 105 can determine a locale of the recipient. In one embodiment, if the user has selected a user of communication client 110 as the recipient, communication client 105 may determine the locale of the recipient by querying the communication client 110 via a peer-to-peer communication link. According to this example, the user of communication client 105 may have selected the user of the communication client 110 as the recipient of an instant message.

In another embodiment, communication client 105 may query server 125 to determine the locale of the recipient. Server 125 may be a messaging server, an e-mail server, a domain name server, or some other suitable server. If server 125 is a messaging server or an e-mail server, users of communication clients 105-120 may have previously provided the locale of each respective communication client 105-120 to server 125. If server 125 is a domain name server, communication client 105 may query the domain name server using the domain of the recipient's e-mail address to determine a locale of a network address for the recipient.

According to another example, communication client 105 may determine the locale of the recipient by finding the locale of the recipient in memory or storage within communication client 105. According to this example, communication client 105 may have previously determined the locale of the recipient from an external source and saved the locale information. According to yet another example in which the user of communication client 105 chooses to reply to a message from another user, the communication client 105 may find the locale of the recipient in the message that was received from the other user.

Upon determining the locale of the recipient, communication client 105 can determine a locale setting that can be applied within the communication client 105, e.g., a locale setting relating to an application program such as the communication application, the operating system, or the like. For example, the locale setting can specify the manner in which text is to be displayed within user interface 135 of the communication application. The locale setting can be one that is typically employed in the locale of the recipient. For example, such a locale setting may be a spelling rule, a grammatical rule, a date rule, a time rule, a number format rule, a currency rule, or some other suitable rule.

In one embodiment, communication client 105 may determine a locale setting by replacing an existing locale setting with a locale setting for the locale of the recipient. According to this example, if the locale setting is a spelling rule, communication client 105 may replace a spell check dictionary for a locale of the user of communication client 105 with a spell check dictionary for the locale of the recipient. If the locale setting is a date rule, the communication client 105 may replace a date format rule of month/day/year with a date format rule of day/month/year. If the locale setting is a number format rule, the communication client 105 may replace a number format rule of 000,000.000, in which thousands are separated from hundreds with a comma and decimals are preceded with a period, with a number format rule of 000 000,000, in which thousands are separated from hundreds by a space and decimals are preceded by a comma.

Thus, when entering text such as a date into the user interface 135 to create a message, the date would be evaluated within communication client 105 according to the selected locale setting. Thus, dates would be evaluated in terms of conforming to a particular standard not in terms of the locale setting of the sender, but in terms of the locale setting that is selected. Non-conforming dates or text may be indicated using any of a variety of different visual indicators, e.g., underlining, highlighting, audible signals, or the like.

According to another example, communication client 105 may determine a locale setting by combining the existing locale setting within communication client 105 with a locale setting of the recipient. According to this example, if the locale setting is a spelling rule, communication client 105 may modify the locale setting by taking a union of the locale setting of communication client 105 and the locale setting of the communication client of the recipient. Referring to the spell check example, the spell check dictionary for the locale of the recipient may be added or combined with the spell check dictionary used by the communication client 105 or the communication application executing therein. Thus, when creating a message to be sent, the text entered by the sender into user interface 135 can be evaluated for spelling in terms of the union of the two dictionaries. Misspelled text would only be indicated upon the display when considered misspelled by both dictionaries.

In some cases, combining locale settings of two different locales may result in ambiguity. An example of such ambiguity can include combining or taking the union of date related locale settings. While a date of Mar. 18, 2007 may only be interpreted as Mar. 18, 2007, a date of Mar. 10, 2007 may be interpreted as Mar. 10, 2007 in one locale or as 3 Oct. 2007 in another locale. Such ambiguities may be resolved by applying or selecting a particular reconciliation technique. The reconciliation technique, for example, may specify that the locale setting to be applied within one or more or all communication clients 105-120 is the locale setting used by the sender, the recipient(s), or the union of two or more locale settings. The reconciliation techniques will be described herein in greater detail.

In any case, a locale setting that has been determined to result in ambiguity when combined with other locale settings can be classified as exclusive. A locale setting that may be combined with other locale settings and not result in ambiguity, or result in an acceptable level of ambiguity, may be referred to as non-exclusive. An example of a non-exclusive locale setting can include spelling dictionaries where words carry essentially the same meanings with only minor variations in spelling. In illustration, consider one locale where the word "color" is spelled "colour." Combining the two dictionaries, assuming "color" and "colour" have the same definition or meaning, would not result in a level of ambiguity that would prevent one party from understanding the textual communications of another party. If the word "color" carried a completely different meaning that the word "colour," however, the two spelling dictionaries, e.g., locale settings, would be considered exclusive in the same manner that locale settings relating to date syntax may be considered exclusive.

Upon determining a locale setting prior to actually exchanging messages, communication client 105 can apply the locale setting within the communication client 105 or to the communication application such that, in the case of text, for example, text within the user interface 135 is interpreted or processed in accordance with the applied locale setting.

For example, applying a locale setting may take place as the user types text into the user interface 135 or it may take place upon the user making a selection to apply the rule. Application of the locale setting can cause violations of the locale setting to be visually or audibly indicated via user interface 135 or from the communication client 105 in general. For example, misspellings may be indicated in accordance with the combined spelling dictionaries, e.g., the union of the dictionary of the sender and the dictionary of the recipient.

In illustration, if the locale setting relates to spelling, the locale of the user of communication client 105 is the United States, and the locale of the recipient is Australia, the user may type the question, "What colour is your car?" into the user interface 135. Since the locale of the recipient is Australia and the spelling of "colour" is a correct Australian spelling, the word "colour" may appear in the user interface 135 without a misspelling indication, despite the fact that the Unites States dictionary in communication client 105 indicates that the word is misspelled.

According to another example, the locale setting may be applied sequentially to the text within the user interface 135 upon the communication client 105 receiving a selection from the user to apply the rule. For instance, a pop-up window may appear that shows a violation of the locale setting and provide choices to the user for resolving the violation. Upon the user selecting a particular choice, a next violation of the locale setting may appear in the pop-window with choices for resolving this violation. This may proceed until all violations of the rule have been identified to the user and the user has made choices to resolve the violations. Within each pop-up window, a particular locale setting may be applied or selected along with various choices for resolving the violation in accordance with the selected locale setting.

It should be appreciated that application of a locale setting will result in indicating violations of the locale setting, whether visually or audibly, or displaying non-violating text displayed without such indicators. In this sense, applying a locale setting within a communication client, application, and/or operating system further applies the locale setting to a message, thereby generating an output. Still, output or outputting, via application of a locale setting can include, but is not limited to, displaying the message, sending the message, saving the message or messages of a communication session, printing the message, or some other suitable output. For example, in one embodiment, messages of a communication session, e.g., e-mails of a subject thread or messages of an instant messaging session (a transcript) can be saved. The saved messages can also include an indication of the particular locale settings that were in place or selected and applied to the messages to allow a user to read and correctly interpret such messages at some future point in time.

According to another embodiment, a user of communication client 105 can access the communication application via user interface 135 to select multiple recipients for a communication. For example, the user of the communication client 105 may select users of communication clients 110, 115, and 120 as the recipients for the communication, e.g., a message. Upon receiving the selection of the recipients, communication client 105 can determine locales of the recipients. The communication client 105 can then modify a locale setting for user interface 135 in consideration of the locales of the recipients.

For example, communication client 105 can determine a particular locale setting to be applied by combining locale settings of the locales of the recipients. According to this example, communication client 105 can include the locale setting of the user of communication client 105 in the combination of the locale settings of the recipients. If combining the locale settings of the participants, e.g., the sender and recipients of a message, would result in ambiguity, a particular locale setting can be selected from the locale setting group, e.g., the local setting of each participant, according to a reconciliation technique. The selected locale setting may be applied within the communication client 105 and/or any of the communication clients of the recipients.

In one embodiment, the reconciliation technique can be a voting scheme where the locale setting to be applied is selected by a vote. In one example, the voting scheme may be a passive vote. A passive vote for the particular locale setting to be applied or used during the exchange of messages among the users may be conducted by considering the locale settings of the recipients. If a plurality of the recipients share a locale setting and the plurality is at least as large as any other plurality of the recipients that share a locale setting, the locale setting of the plurality of recipients may be selected as the particular locale setting for resolving ambiguities and be applied to messages.

Alternatively, an active vote for a selected locale setting may be conducted by considering an alternative preferential locale for each of the participants. Each of the participants may have pre-selected such an alternative preferential locale or may be queried for a preferred locale setting prior to beginning the exchange of messages. A tie between locale settings in a passive or an active vote may be resolved according to a random selection, querying the user of the communication client 105 for a choice, or some other suitable technique.

Upon determining a particular locale setting, communication client 105 can apply the locale setting to text within the user interface 135. The application of the locale setting may take place as the user types text into user interface 135 or upon the user making a selection to apply the locale setting. It should be appreciated that a locale setting can be determined and applied within each communication client individually, can be applied selected and applied to more than one communication client or to the communication client of another, or different locale settings may be applied within one or more or all of the communication clients.

Figure 2:
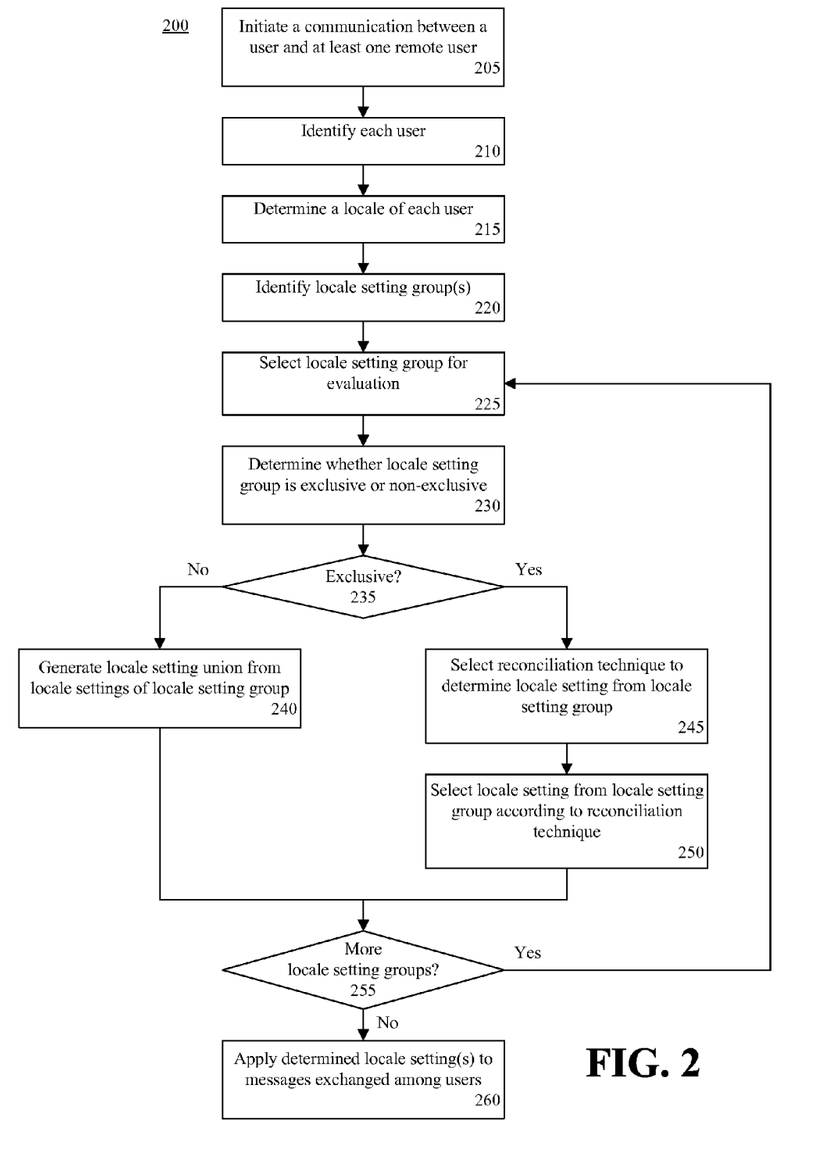
FIG. 2 is a flow chart illustrating a method of negotiating locale settings for a communication session in accordance with another embodiment of the present invention.

FIG. 2 is a flow chart illustrating a method 200 of negotiating locale settings for a communication session in accordance with another embodiment of the present invention. As noted, a communication session can include an instant messaging session in which instant messages are exchanged among participants of the instant messaging session or the sending of e-mail among participants, e.g., the sender and recipient(s). The method 200 can begin in a state where a user is preparing to begin communicating with one or more other users via the exchange of messages over a communication network. The mode of communication, as noted, may include sending an e-mail, establishing an instant messaging session and sending instant messages, or the like.

Method 200 can be performed using a system as described with reference to FIG. 1. In one embodiment, the various processing decisions and steps described with reference to FIG. 2 may be performed by one or more of the communication clients working individually or cooperatively with one another. In another embodiment, the various processing steps and/or decisions may be implemented by the server, e.g., in a centralized fashion. For example, involvement of a server may be appropriate in the context of an instant messaging session where each user must have presence to participate.

Method 200 can begin in step 205 where a communication, e.g., a message, can be initiated between a user and at least one other remote user. For example, the user can choose to reply to a message, create a new message, or the like and specify recipients for the message. In step 210, each user involved in the communication session can be identified. That is, each of the users that will participate in the exchange of the message or messages can be identified, e.g., the sender and each recipient of the message.

In step 215, a locale of each user can be determined. In one embodiment, for example, the communication client of the sender can determine the locale of each user by querying a server for locale information for each recipient. In another embodiment, the communication client of the sender can establish one or more peer-to-peer communication links with the communication clients of the recipients and query each respective communication client for locale information for that communication client.

In step 220, locale setting groups can be identified. A locale setting group can refer to a collection of locale settings, e.g., one for each participant in the message exchange or communication session. For example, a locale setting group can refer to the locale setting specifying spelling preferences for each user. Another locale setting group can specify the locale setting for displaying and interpreting dates for each user. Thus, a plurality of different locale setting groups may be identified for a given communication session.

In step 225, a particular locale setting group from those identified in step 220 can be selected for evaluation. More particularly, a locale setting group can be selected to determine a locale setting according to the locale setting group that will be utilized or applied for the communication session. In step 230, the classification of the selected locale setting group can be identified. More particularly, the selected locale setting group can be identified as being exclusive or non-exclusive. Such designations may be predetermined and stored. For example, exclusive locale setting groups can be specified and stored as combinations of locale settings that, when included within a same locale setting group, indicate an exclusive locale setting group, e.g., ambiguity results if a union of the locale settings is taken. Non-exclusive locale setting groups can be specified and stored as combinations of locale settings that, when included within a same locale setting group, are not exclusive, e.g., do no not result in ambiguity when a union is taken. In step 235, a determination can be made as to whether the selected locale setting group is exclusive. If so, the method can proceed to step 245. If not, the method can continue to step 240.

In step 240, where the locale setting group is non-exclusive, a locale setting can be generated by taking the union of all locale settings in the selected locale setting group. Such is the case, as noted, since taking a union will not result in any ambiguities among the different locale settings of the locale setting group. After step 240, the method can continue to step 255.

In step 245, a reconciliation technique can be selected to determine the locale setting to be applied to the message or messages to be exchanged among the users. In one embodiment, the reconciliation technique can be a voting scheme, whether passive or active. In the case of a passive voting scheme, any majority or the largest plurality of users sharing a same locale or locale setting can be selected as the locale setting to be applied. That locale setting can be applied within the communication client of the sender, within the communication client of one or more recipients, or within all communication clients. In another embodiment, the voting scheme can be an active voting scheme where one or more or all of the users are polled as to the desired locale setting to use. Response votes specifying preferred locale settings from one or more or all of the users can be tallied to determine the locale setting of the locale setting group to be used.

In another embodiment, the selected reconciliation technique can simply be selecting a locale setting from the locale setting group and applying that locale setting in one or more or all of the communication clients to be communicating. The locale setting of the sender may be selected by default, the locale setting of a recipient may be selected by default, or the like. In another embodiment, where the users are part of the same organization and organizational information is available, the locale setting can be selected according to the role of users within the organizational hierarchy. For example, the locale setting of the highest ranking user may be selected automatically.

The reconciliation technique can be selected automatically, e.g., via user preference or specified by default. In one embodiment, each user may specify a preference for a reconciliation technique that can be selected according to a voting scheme as described herein. In another embodiment, the reconciliation technique can be selected according to organizational role of the user(s). In any case, in step 250, the locale setting from the locale setting group can be selected according to the reconciliation technique.

In step 255, a determination can be made as to whether more locale setting groups are to be evaluated. If so, the method can loop back to step 225 to continue processing further locale setting groups. If not, the method can proceed to step 260, where the determined locale setting(s) can be applied to messages exchanged among the users. As noted, the locale setting may be applied within communication client(s) in terms of the communication application, the operating system, etc., which can result in application of the locale setting to messages.

It should be appreciated that a locale setting can be selected and applied within a messaging client of one participant in the communication session, while a different locale setting can be selected and applied concurrently within a messaging client of a different one of the plurality of users of the communication session. In another example, a selected locale setting, e.g., one that is exclusive, may be applied within the communication client of each, or more than one, of the participants in the communication session. In cases where the locale setting group is non-exclusive, the union locale setting may be applied within each communication client of a participant.

The method disclosed herein allows different reconciliation techniques to be used in determining locale settings for each different locale setting group, e.g., for a time locale setting group, another for a date locale setting group, etc. Accordingly, a union of locale settings may be used for a dictionary or spelling, while the locale setting of the sender can be used for locale settings relating to dates, and a locale setting of a recipient is used for the locale setting relating to expressing numbers.

As noted, the particular locale setting chosen for each locale setting group can be specified and recorded with each communication, with a communication transcript, or the like such that individuals accessing the messages in the future may know the locale setting that was applicable to the message.

It should be appreciated that although the locale setting negotiation techniques disclosed herein have been illustrated with respect to e-mail and/or instant messaging, such techniques also may be applied or used with any of a variety of collaborative applications where two or more remotely located users establish a communication session. For example, the locale setting negotiation techniques disclosed herein can be applied to an editing session in which two or more remotely located users edit an electronic document. The selected locale settings can be applied to communications as well as to the document being generated and/or edited.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. Within a system comprising a processor and a memory, a method of negotiating locale settings among a plurality of users communicating over a communication network comprising:
   via the processor, determining a locale for each of a plurality of remotely located users;
   via the processor, identifying at least one locale setting for each of the plurality of users according to the locale of each respective user, wherein the locale setting for each of the plurality of users comprises at least one locale setting group;
   via the processor, determining whether each locale setting group is exclusive or non-exclusive;
   for each locale setting group that is exclusive, via the processor, selecting a locale setting from the locale setting group;
   for each locale setting group that is non-exclusive, via the processor, generating a locale setting union by taking a union of all locale settings of the locale setting group; and
   via the processor, applying at least one of the selected locale setting or the local setting union to a message exchanged among the plurality of users.

2. The method of claim 1, wherein determining a locale for each of a plurality of remotely located users comprises the processor querying a server for locale information.

3. The method of claim 1, wherein determining a locale for each of a plurality of remotely located users comprises a communication client of at least one of the plurality of users exchanging locale information via at least one peer-to-peer communication link with at least another one of the plurality of users.

4. The method of claim 1, wherein for each locale setting group that is exclusive, selecting a locale setting from the locale setting group comprises:
   via the processor, applying a locale setting of a first of the plurality of users within a communication client of a second one the plurality of users; and
   via the processor, concurrently applying a locale setting of the second one of the plurality of users within a communication client of the first of the plurality of users.

5. The method of claim 1, wherein for each locale setting group that is exclusive, via the processor, selecting a locale setting from the locale setting group comprises selecting a locale setting of a first of the plurality of users and, via the processor, applying the locale setting within a communication client of the first of the plurality of users and a communication client of a second of the plurality of users.

6. The method of claim 1, wherein for each locale setting group that is exclusive, via the processor, selecting a locale setting from the locale setting group comprises choosing a locale setting according to a selected reconciliation technique.

7. Within a system comprising a processor and a memory, a method of negotiating locale settings among a plurality of users communicating over a communication network comprising:
   via the processor, identifying a plurality of remotely located users comprising at least three users;
   via the processor, determining a locale for each of the plurality of users;
   via the processor, identifying a locale setting for each of the plurality of users according to the locale for each user, wherein the locale setting for each of the plurality of users comprises a locale setting group;
   via the processor, determining at least one selected locale setting according to a reconciliation technique applied to the locale setting group; and
   via the processor, applying the selected locale setting to messages exchanged among the plurality of users.

8. The method of claim 7, wherein determining a locale for each of the plurality of users comprises the processor querying a server for locale information.

9. The method of claim 7, wherein determining a locale for each of the plurality of users comprises a communication client of at least one of the plurality of users exchanging locale information via at least one peer-to-peer communication link with at least another one of the plurality of participants.

10. The method of claim 7, further comprising:
via the processor, identifying the locale setting group as exclusive; and
via the processor, selecting the reconciliation technique to be a voting scheme, wherein determining at least one selected locale setting comprises the processor determining at least one selected locale setting according to a vote taken among the plurality of users according to the voting scheme.

11. The method of claim 10, further comprising:
via the processor, selecting the voting scheme to be a passive voting scheme; and
via the processor, automatically choosing a locale setting from the group of locale settings having a highest level of incidence among the plurality of users as the selected locale setting.

12. The method of claim 10, further comprising:
via the processor, selecting the voting scheme to be an active voting scheme;
via the processor, querying at least one of the plurality of users to vote for a preferred locale setting;
via the processor, receiving a plurality of votes, wherein each vote specifies a preferred locale setting from the locale setting group; and
via the processor, choosing the locale setting from the local setting group that receives the most votes as the selected locale setting.

13. The method of claim 7, further comprising:
via the processor, identifying the locale setting group as non-exclusive; and
via the processor, selecting the reconciliation technique to be taking a union of locale settings of the locale setting group, wherein determining at least one selected locale setting comprises, via the processor, generating a union locale setting by taking a union of all locale settings of the locale setting group.

14. The method of claim 7, wherein a plurality of locale setting groups are determined and each locale setting group comprises a locale setting for each of the plurality of users, wherein determining at least one selected locale setting comprises:
via the processor, identifying each locale setting group as exclusive or non-exclusive;
for each locale setting group that is exclusive, via the processor, selecting the reconciliation technique to be a voting scheme, wherein determining at least one selected locale setting comprises the processor determining at least one selected locale setting according to a vote taken among the plurality of users according to the voting scheme; and
for each locale setting group that is non-exclusive, via the processor, selecting the reconciliation technique to be taking a union of locale settings of the locale setting group, wherein determining at least one selected locale setting comprises the processor generating a union locale setting by taking a union of all locale settings of the locale setting group.

15. A computer program product comprising:
non-transitory computer-readable medium having stored thereon non-transitory computer-readable medium program code that, when executed by a system comprising a processor and a memory, negotiates locale settings among a plurality of users communicating over a communication network, the non-transitory computer-readable medium computer comprising:
non-transitory computer-readable medium program code that identifies a plurality of remotely located users comprising at least three users;
non-transitory computer-readable medium program code that determines a locale for each of the plurality of users;
non-transitory computer-readable medium program code that identifies a locale setting for each of the plurality of users according to the locale for each user, wherein the locale setting for each of the plurality of users comprises a locale setting group;
non-transitory computer-readable medium program code that determines at least one selected locale setting according to a reconciliation technique applied to the locale setting group; and
non-transitory computer-readable medium program code that applies the selected locale setting to messages exchanged among the plurality of users.

16. The computer program product of claim 15, wherein the non-transitory computer-readable medium further comprises: non-transitory computer-readable medium program code that identifies the locale setting group as exclusive; and non-transitory computer-readable medium program code that selects the reconciliation technique to be a voting scheme, wherein the non-transitory computer-readable medium program code that determines at least one selected locale setting comprises non-transitory computer-readable medium program code that determines at least one selected locale setting according to a vote taken among the plurality of users according to the voting scheme.

17. The computer program product of claim 16, wherein the non-transitory computer-readable medium further comprises:
non-transitory computer-readable medium program code that selects the voting scheme to be a passive voting scheme; and
non-transitory computer-readable medium program code that automatically chooses a locale setting from the group of locale settings having a highest level of incidence among the plurality of users as the selected locale setting.

18. The computer program product of claim 16, wherein the non-transitory computer-readable medium further comprises:
non-transitory computer-readable medium program code that selects the voting scheme to be an active voting scheme;
non-transitory computer-readable medium program code that queries at least one of the plurality of users to vote for a preferred locale setting;
non-transitory computer-readable medium program code that receives a plurality of votes, wherein each vote specifies a preferred locale setting from the locale setting group; and
non-transitory computer-readable medium program code that chooses the locale setting from the local setting group that receives the most votes as the selected locale setting.

19. The computer program product of claim 15, wherein the non-transitory computer-readable medium further comprises:
non-transitory computer-readable medium program code that identifies the locale setting group as non-exclusive; and
non-transitory computer-readable medium program code that selects the reconciliation technique to be taking a union of locale settings of the locale setting group, wherein the non-transitory computer-readable medium program code that determines at least one selected locale setting comprises non-transitory computer-readable medium program code that generates a union locale setting by taking a union of all locale settings of the locale setting group.

20. The computer program product of claim 15, wherein a plurality of locale setting groups are determined and each locale setting group comprises a locale setting for each of the plurality of users, wherein the non-transitory computer-readable medium program code that determines at least one selected locale setting comprises: non-transitory computer-readable medium program code that identifies each locale setting group as exclusive or non-exclusive;

non-transitory computer-readable medium program code that, for each locale setting group that is exclusive, selects the reconciliation technique to be a voting scheme, wherein the non-transitory computer-readable medium program code that determines at least one selected locale setting comprises non-transitory computer-readable medium program code that determines at least one selected locale setting according to a vote taken among the plurality of users according to the voting scheme; and non-transitory computer-readable medium program code that, for each locale setting group that is non-exclusive, selects the reconciliation technique to be taking a union of locale settings of the locale setting group, wherein the non-transitory computer-readable medium program code that determines at least one selected locale setting comprises non-transitory computer-readable medium program code that generates a union locale setting by taking a union of all locale settings of the locale setting group.

\* \* \* \* \*